US012437912B2

(12) United States Patent
Park et al.

(10) Patent No.: US 12,437,912 B2
(45) Date of Patent: Oct. 7, 2025

(54) COIL COMPONENT

(71) Applicant: SAMSUNG ELECTRO-MECHANICS CO., LTD., Suwon-si (KR)

(72) Inventors: Heung Kil Park, Suwon-si (KR); Gu Won Ji, Suwon-si (KR); Sang Soo Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 810 days.

(21) Appl. No.: 17/119,378

(22) Filed: Dec. 11, 2020

(65) Prior Publication Data

US 2022/0102056 A1 Mar. 31, 2022

(30) Foreign Application Priority Data

Sep. 28, 2020 (KR) ........................ 10-2020-0126063

(51) Int. Cl.
*H01F 27/29* (2006.01)
*H01F 27/28* (2006.01)
*H01F 41/04* (2006.01)

(52) U.S. Cl.
CPC ......... *H01F 27/2804* (2013.01); *H01F 27/29* (2013.01); *H01F 41/041* (2013.01); *H01F 2027/2809* (2013.01)

(58) Field of Classification Search
CPC .... H01F 27/2804; H01F 27/29; H01F 41/041; H01F 2027/2809; H01F 17/0013; H01F 27/33; H01F 27/292; H01F 5/04; H01F 27/022
USPC .......................................................... 336/192
See application file for complete search history.

(56) References Cited

U.S. PATENT DOCUMENTS 10,062,511 B1 * 8/2018 Park ........................ H05K 1/111
10,304,618 B2 * 5/2019 Park ........................ H01F 27/292
10,483,040 B1 * 11/2019 Kim ........................ H01G 2/06
2015/0048915 A1 2/2015 Yoon et al.
2015/0270068 A1 * 9/2015 Hattori ..................... H01C 1/14
361/301.4
2016/0111215 A1 4/2016 Park et al.
2017/0103847 A1 4/2017 Park et al.
(Continued)

FOREIGN PATENT DOCUMENTS

JP 2012-204572 A 10/2012
KR 10-2015-0019730 A 2/2015
KR 10-2016-0044249 A 4/2016
(Continued)

OTHER PUBLICATIONS

Office Action dated Jan. 23, 2025 issued in corresponding Korean Patent Application No. 10-2020-0126063 with the English translation.

*Primary Examiner* — Tuyen T Nguyen
(74) *Attorney, Agent, or Firm* — Morgan Lewis & Bockius LLP

(57) ABSTRACT

A coil component includes a body; a coil disposed in the body; first and second external electrodes disposed on a first surface of the body, which is a lower surface of the body, spaced apart from each other, and connected to the coil; and first and second terminals disposed on lower surfaces of the first and second external electrodes, respectively, to be in contact with the first and second external electrodes.

20 Claims, 8 Drawing Sheets

(56) References Cited

U.S. PATENT DOCUMENTS

2019/0326059 A1 10/2019 Park et al.

FOREIGN PATENT DOCUMENTS

| | | | | |
|---|---|---|---|---|
| KR | 10-1681429 | B1 | | 11/2016 |
| KR | 20170090258 | A | * | 8/2017 |
| KR | 10-2018-0134264 | A | | 12/2018 |
| KR | 10-2019-0122413 | A | | 10/2019 |

* cited by examiner

COIL COMPONENT

CROSS-REFERENCE TO RELATED APPLICATION(S)

This application claims the benefit of priority to Korean Patent Application No. 10-2020-0126063, filed on Sep. 28, 2020 in the Korean Intellectual Property Office, the disclosure of which is incorporated herein by reference in its entirety.

TECHNICAL FIELD

The present disclosure relates to a coil component, a coil component which may reduce acoustic noise.

BACKGROUND

In recent years, since components of electronic devices have been configured to be quieter, acoustic noise has been a prominent issue. Acoustic noise refers to noise from vibrations which is, when an input signal period is in an audible frequency band, generated by displacement that becomes vibrations and is transmitted to a substrate through solders, the vibrations of the substrate being heard as noise. Acoustic noise may be one of a number of problems in electronic devices. Similarly to a multilayer capacitor, an inductor may be magnetostrictively deformed by synchronizing application of a current and formation of magnetism. In the case in which an operating environment of a device is quiet, a user may conclude that acoustic noise is caused by a defect of the device, and in a device having a voice circuit, acoustic noise may overlap a voice output such that quality of the device may be degraded.

SUMMARY

An aspect of the present disclosure is to provide a coil component in which a height of solder of an inductor may be configured to be low.

Another aspect of the present disclosure is to provide a coil component which may reduce vibrations of an inductor.

According to an aspect of the present disclosure, a structure which may reduce a height of folder fillet and acoustic noise by disposing a terminal in which a cut-out portion is formed in a lower portion of an external electrode.

For example, a coil component may include a body; a coil disposed in the body; first and second external electrodes disposed on a first surface of the body, which is a lower surface of the body, spaced apart from each other, and connected to the coil; and first and second terminals disposed on lower surfaces of the first and second external electrodes, respectively, to be in contact with the first and second external electrodes.

According to another aspect of the present disclosure, a coil component may include a body; a coil disposed in the body; first and second external electrodes disposed on a first surface of the body spaced apart from each other, and connected to the coil; and first and second terminals disposed on the first and second external electrodes, respectively. The first and second terminals include first and second recessed portions on defined on first and second side surfaces of the first and second terminals, respectively.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will be described as follows with reference to the attached drawings.

In electronic devices, various types of electronic components may be used, and various types of coil components may be used between the electronic components to remove noise, and other purposes.

In an electronic device, a coil component may be used as a power inductor, an HF inductor, a general bead, a GHz bead, a common mode filter, and the like.

Figure 1:
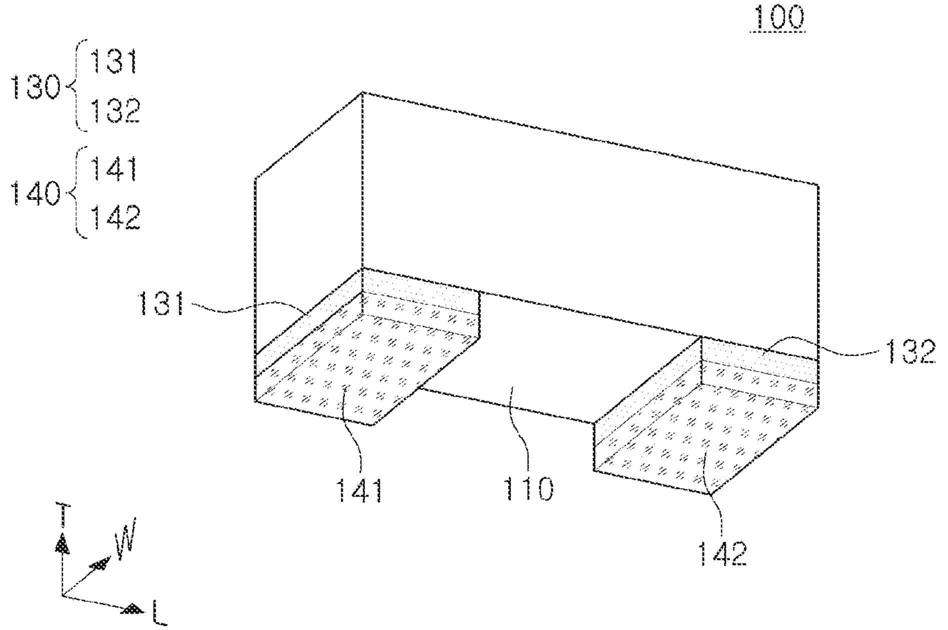
FIG. 1 is a perspective diagram illustrating an example of a coil component.

FIG. 1 is a perspective diagram illustrating an example of a coil component.

Referring to FIG. 1, a coil component 100 in the first embodiment may include a body 110, external electrodes 131 and 132 disposed on a lower surface of the body 110, and first and second terminals 141 and 142 disposed on lower surfaces of the first and second external electrodes 131 and 132, respectively.

The body 110 may form an exterior of the coil component 1000, and may include the coil portion 300 disposed therein.

The body 110 may have a hexahedral shape.

With respect to a direction of the body 110, L, W, and T in the diagrams refer to a length direction, a width direction, and a thickness direction of the body 110, respectively. Also, in the example embodiment, a thickness direction may be the same as the direction in which the stacked-type coil patterns are stacked.

The body 110 may include a first surface 1 and a second surface 2 opposing each other in the thickness direction (T), a third surface 3 and a fourth surface 4 opposing each other in the length direction (L), and a fifth surface 5 and a sixth surface 6 opposing each other in the width direction (W). The third to sixth surfaces 3, 4, 5, and 6 of the body 110 may be wall surfaces of the body 110 connecting the first surface 1 to the second surface 2 of the body 110. In the description below, the lower surface and the upper surface of the body 110 refer to the first surface 1 and the second surface 2 of the body 110, respectively, and both side surfaces of the body 110 refer to the third surface 3 and the fourth surface 4 of the body.

The body 110 may include a magnetic material and resin. For example, the body 110 may be formed by layering one or more magnetic material sheets including resin and a magnetic material dispersed in resin. The body 110 may also have a structure different from the structure in which a magnetic material is disposed in resin. For example, the body 110 may be formed of a magnetic material such as ferrite.

The magnetic material may be ferrite powder or magnetic metal power.

The ferrite power may be one or more of spinel ferrite such as Mg—Zn based ferrite, Mn—Zn based ferrite, Mn—Mg based ferrite, Cu—Zn based ferrite, Mg—Mn—Sr based ferrite, Ni—Zn based ferrite, and the like, hexagonal ferrite such as Ba—Zn based ferrite, Ba—Mg based ferrite, Ba—Ni based ferrite, Ba—Co based ferrite, Ba—Ni—Co based ferrite, and the like, garnet ferrite such as Y based ferrite, and Li based ferrite, for example.

The magnetic metal power may include one or more selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal power may be at least one or more of pure iron powder, Fe—Si based alloy power, Fe—Si—Al based alloy power, Fe—Ni based alloy power, Fe—Ni—Mo based alloy power, Fe—Ni—Mo—Cu based alloy power, Fe—Co based alloy power, Fe—Ni—Co based alloy power, Fe—Cr based alloy power, Fe—Cr—Si based alloy power, Fe—Si—Cu—Nb based alloy power, Fe—Ni—Cr based alloy power, and Fe—Cr—Al based alloy power.

The magnetic metal power may be amorphous or crystalline. For example, the magnetic metal power may be Fe—Si—B—Cr based amorphous alloy power, but an example embodiment thereof is not limited thereto.

The resin may include one of epoxy, polyimide, liquid crystal polymer, and or a mixture thereof, but an example embodiment thereof is not limited thereto.

The coil components 100 and 200 applied to the example embodiment may be an inductor, and may be one of a wound-type inductor, a stacked-type inductor, and a thin film type inductor.

When the coil components 100 and 200 are wound-type inductors, the coil components 100 and 200 may include a coil 120 disposed in a spiral shape in the body 110, and when the coil components 100 and 200 are multilayer inductors, a plurality of ceramic layers may be stacked in the body 110, and a plurality of coils 120 may be formed on the plurality of ceramic layers.

When the coil components 100 and 200 are thin film type inductors, a coil 120 including a seed layer and an electroplating layer may be formed on a support substrate. The seed layer may be formed by an electroless plating method or a vapor deposition method such as sputtering. Each of the seed layer and the electroplating layer may have a single-layer structure or a multilayer structure. The electroplating layer having a multilayer structure may be formed in a conformal film structure in which one electroplating layer is covered by another electroplating layer, or the other electroplating layer is only stacked on one surface of one of the electroplating layer.

The coil 120 may be disposed in the body 110 and may be exposed to at least a portion of the first surface 1, the third to sixth surfaces 3, 4, 5, and 6 of the body 110. The exposed coil 120 may be connected to and may be in contact with the first and second external electrodes 131 and 132.

In the case of the coil component 100 in the example embodiment in FIG. 1, a structure in which the first and second external electrodes 131 and 132 may be disposed on the first surface 1 of the body 110 is illustrated, and in this case, the coil 120 may be exposed to the first surface 1 of the body 110 and may be connected to the first and second external electrodes 131 and 132.

The coil 120 may have a lead-out portion on the exposed surface connected to the external electrode. The coil 120 and the lead-out portion may be integrated with each other such that a boundary may not be formed therebetween. For example, the first coil pattern 311 and the first lead-out portion 331 may be simultaneously formed through the same process such that a boundary may not be formed between upper and lower portions. However, an example embodiment thereof is not limited thereto.

The first surface 1 of the body 110 may be a mounting surface of the body 110, and the first and second external electrodes 131 and 132 may be disposed on the first surface 1. As the external electrode 130 is disposed on the first surface 1 of the body 110, a size of the body 110 may be configured to be larger than that of a structure in which the external electrode extends onto the side surface or the upper surface. Accordingly, a structure in which inductance is increased by magnetic powder may be implemented, and a short with the neighboring components may be prevented.

The first and second external electrodes 131 and 132 may be disposed on the first surface 1 of the body 110, a mounting surface, may be spaced apart from each other in a length direction L, may be provided with voltages of different polarities, and may be electrically connected to the exposed portion of the coil 120.

If necessary, a plating layer may be formed on the surfaces of the first and second external electrodes 131 and 132. Each of the first and second external electrodes 131 and 132 may include at least one of a conductive resin layer and an electroplating layer. The conductive resin layer may be formed by printing a conductive paste on the surface of the body 110 and curing the conductive paste, and may include one or more conductive metals selected from a group consisting of copper (Cu), nickel (Ni), and silver (Ag) and a thermosetting resin. The electroplating layer may include at least one selected from a group consisting of nickel (Ni), copper (Cu), and tin (Sn).

For example, each of the first and second external electrodes 131 and 132 may include a conductive layer or a conductive resin layer, a nickel (Ni) plated layer formed on the conductive layer or the conductive resin layer, and a tin (Sn) plated layer formed on the nickel plated layer.

First and second terminals 141 and 142 may be disposed on the lower surfaces of the first and second external electrodes 131 and 132, respectively.

The first and second terminals 141 and 142 may be disposed to be in contact with the external electrode 130 disposed on the first surface 1 of the body 110, the lower surface of the body 110. In this case, the external electrode 130 and the terminal 140 may be bonded to each other using a conductive adhesive such as a high melting point solder or a conductive paste.

The terminal 140 including the first and second terminals 141 and 142 may include first layers 140*a*, 141*a*, and 142*a* and second layers 140*b*, 141*b*, and 142*b* formed on the first layers. The first layer 140*a* may include a soft metal. As an example, although not limited thereto, the first layer 140*a* may include at least one of copper (Cu), gold (Au), and aluminum (Al). As the first and second terminals 141 and 142 include a flexible metal, a damping effect for reducing vibrations of the coil component 100 may be obtained, and acoustic noise may be reduced.

The second layer 140*b* may be formed in the form of a conductor layer on the surface of the first layer 140*a*. The second layer 140*b* may be a conductor layer including a conductive metal and may be formed of a plating layer. The second layer 140*b* may include at least one of nickel (Ni) and tin (Sn), for example.

The terminal 140 included in the coil component 100 in the first embodiment may be disposed on the lower surface of the external electrode 130. The terminal 140 may absorb and block vibrations generated in the body 110. Therefore, when vibrations of the inductor on the external electrode 130 occurs, vibrations may be effectively absorbed, and as a large vibration absorption area is included, vibrations transmitted to the substrate disposed below the inductor may be reduced such that the effect of reducing acoustic noise may improve. Due to the formation of magnetic force by applying a current, the inductor may cause magnetostriction, and in the case in which an input signal period is within an audible frequency band, the deformation may cause vibrations. When the vibrations are transmitted to the substrate connected to the coil component 100 through solders, the vibrations may cause a problem in the electronic device. The terminal 140 of the example embodiment may absorb and block such vibrations.

Also, by increasing a contact area between the external electrode 130 and the substrate disposed below the external electrode 130 by including the terminal 140, adhesive strength and connection reliability may improve.

Figure 2:
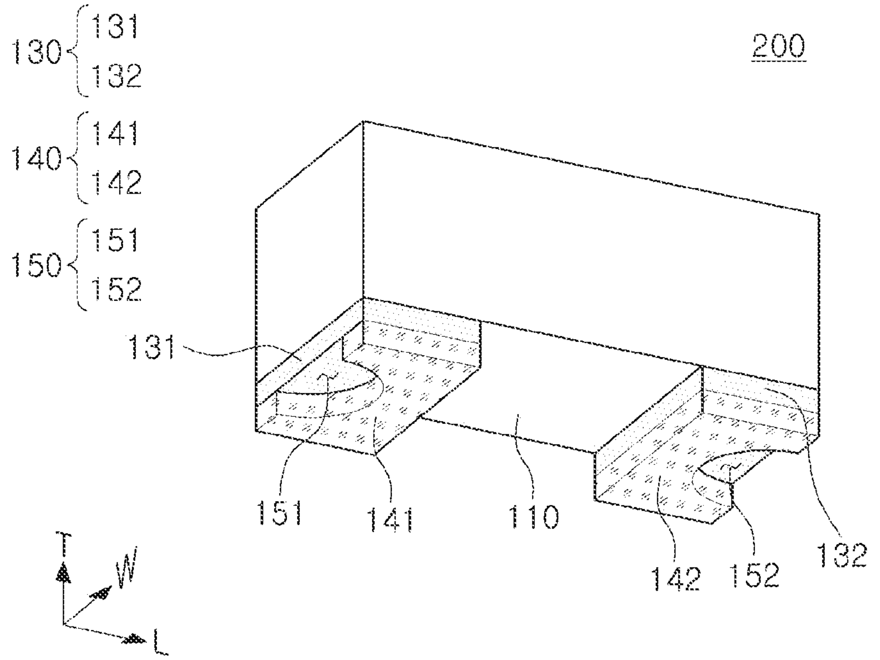
FIG. 2 is a perspective diagram illustrating another example of a coil component.
Figure 3:
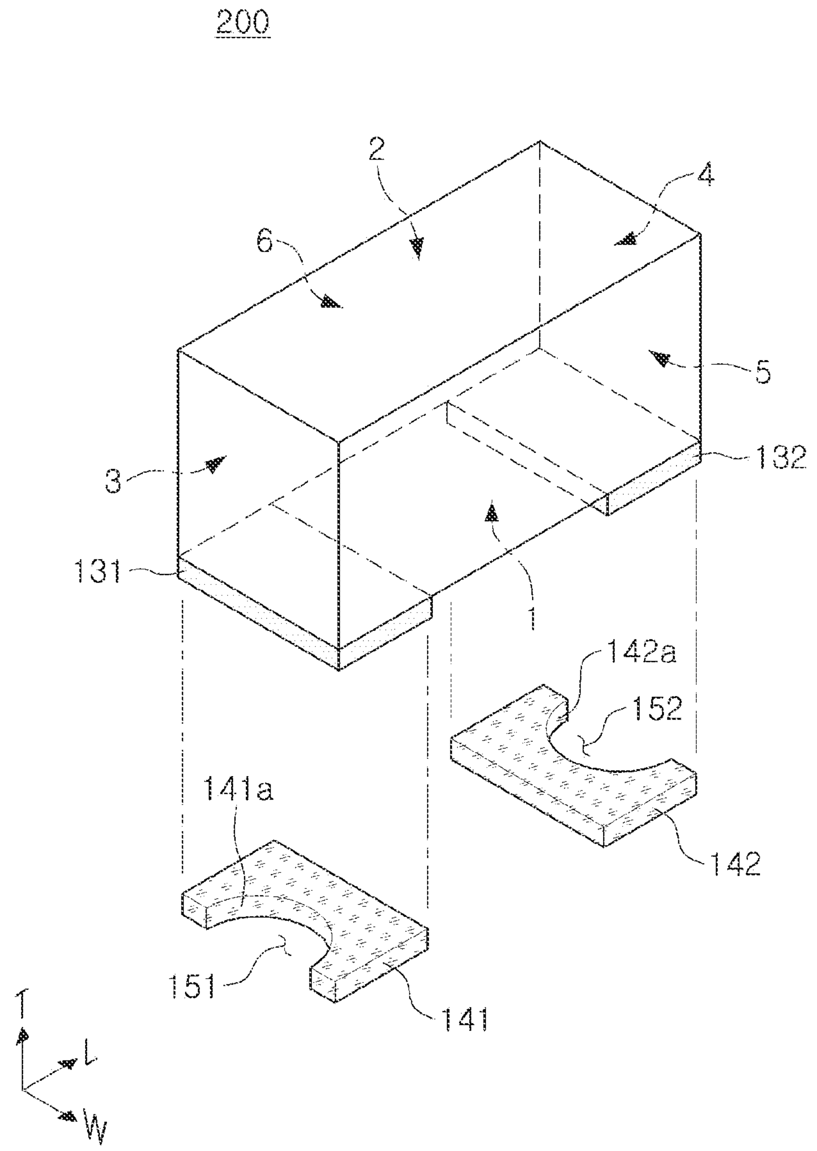
FIG. 3 is an exploded perspective diagram schematically illustrating the coil component illustrated in FIG. 2.

FIG. 2 is a perspective diagram illustrating another example of a coil component. FIG. 3 is an exploded perspective diagram schematically illustrating the coil component illustrated in FIG. 2.

The coil component 200 in the second embodiment in FIG. 2 may have a structural difference from the coil component 100 of the first example embodiment in terms of the shape of the terminal 140. The elements similar to those in the aforementioned example embodiment will not be repeated to avoid overlapping descriptions.

In the coil component 200 in the second embodiment, the terminal 140 may be disposed in and in contact with the lower surface of the external electrode 130. In this case, first and second recessed portions 151 and 152 may be formed in at least a portion of regions of the first and second terminals 141 and 142.

The first and second terminals 141 and 142 may include upper surfaces H1 and H2 in contact with the first and second external electrodes 131 and 132, lower surfaces B1 and B2 opposing the upper surface, first and second side surfaces 1' and 2' connecting the upper and lower surfaces to each other and opposing each other, first and second side surfaces 3' and 4' connecting the first side surface and the second side surface and opposing each other.

In the first and second terminals 141 and 142, inflow of piezoelectric vibrations generated by the body 110 into the substrate may be reduced by configuring the mounted substrate and the body 110 to be spaced apart from each other by a predetermined distance.

The first and second recessed portions 151 and 152 may be formed on at least a portion of side surfaces of the first and second terminals 141 and 142, respectively. Referring to FIG. 2, lengths of the first and second recessed portions 151 and 152 may be smaller than lengths of the first and second terminals 141 and 142. In other words, the first and second recessed portions 151 and 152 may not penetrate the first and second terminals 141 and 142 in a length direction L.

According to one embodiment of the present disclosure, The first recessed portion 151 may have a curved surface on the first side surface '1 of the first terminal 141, and may be recessed in the direction of the second side surface 2'. Accordingly, the first recessed portion may have a shape in which a width thereof in the width direction W is decreasing in a direction toward a center of the first surface, but an example embodiment thereof is not limited thereto.

The second recessed portion 152 may be formed in a shape opposing the first recessed portion 151 in the second terminal 142. Accordingly, the first recessed portion 151 and the second recessed portion 152 may be symmetrical to each other with reference to the center of the first surface 1 of the body 110. Therefore, to correspond to the first recessed portion 151, the second recessed portion 152 may have a curved surface on the second side surface 2" of the second terminal 142 and may be recessed in the direction of the first side surface 1". Also, the second recessed portion may have a shape in which a width thereof in the width direction W is decreasing in a direction toward the center of the first surface of the body 110, but an example embodiment thereof is not limited thereto.

Accordingly, the first and second recessed portions 151 and 152 may have a shape of a cut cylinder as illustrated in FIG. 2, and although not illustrated, the first and second recessed portions 151 and 152 may have a triangular shape. The shape is not limited to any particular shape as long as widths of the first and second recessed portions 151 and 152 may different in the length direction L.

According to another embodiment of the present disclosure, the first and second recessed portions 151 and 152 may have substantially the same widths in the length direction L, in addition to the above-described embodiment having different widths in the length direction L. Accordingly, the first and second recessed portions 151 and 152 may have a hexahedral shape.

Due to the configuration of the first and second recessed portions 151 and 152, a space in which solders 231 and 232 are disposed may be formed. When the coil component 200 is mounted on the substrate 210, the molten solders 231 and 232 may be disposed on side surfaces of the external electrode 130 and the terminal 140. The molten solders 231 and 232 may fill the inside of the recessed portion 150 according to the shape of the recessed portion 150, and accordingly, when the same amount of solder 231, 232 is used, the height of the solders 231 and 232 may be formed lower than in the structure in which the recessed portion 150 is not included.

When the coil component 200 of the second embodiment is disposed on a substrate, the height of the solders 231 and 232 may be formed to be lower than in the structure in which the recessed portion 150 is not included. Accordingly, a transmission path of vibrations generated by the coil component 200 may be blocked, and vibrations transmitted to the substrate may be prevented such that acoustic noise may be effectively reduced.

Also, generally, to form the height of the solder 231 and 232 to be low, the amount of solder for each component may need to be adjusted such that productivity decreases. However, in the coil component 200 in the second example embodiment, a recessed portion 150 which may be filled with solders 231 and 232 is formed such that, without adjusting the mounted of solder 231 and 232, the height of solder may be configured to be lower than in the structure which does not include the recessed portion 150, and accordingly, productivity may improve and process time may be reduced.

Figure 4:
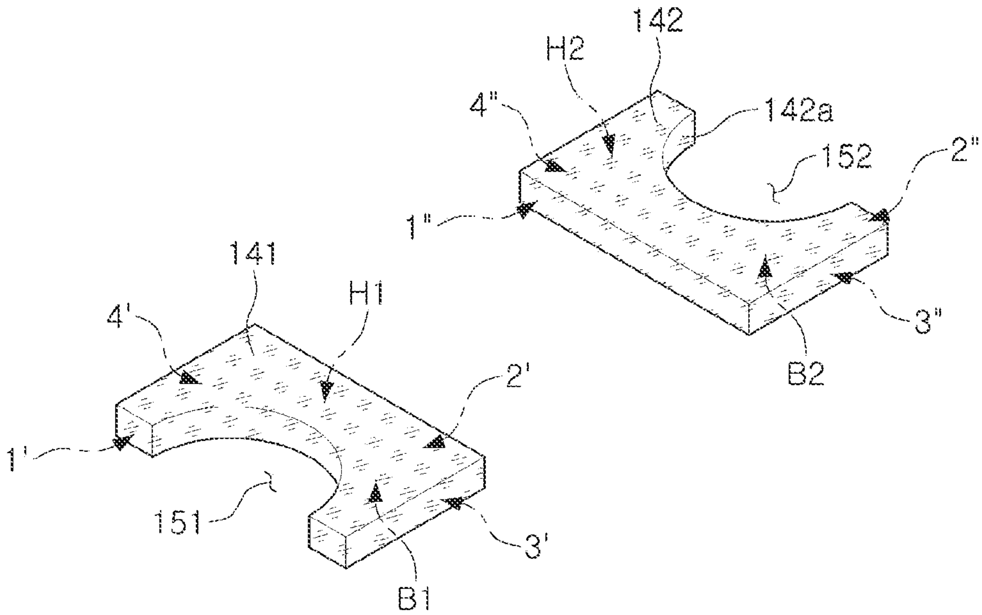
FIG. 4 is a perspective diagram schematically illustrating a terminal of the coil component illustrated in FIG. 3.

FIG. 4 is a perspective diagram schematically illustrating a terminal of the coil component illustrated in FIG. 3.

As described above, the terminal 140 may have an upper surface and a lower surface, and first to fourth side surfaces, and the configuration may be to specify the position in which the recessed portion 150 is formed, and an example embodiment thereof is not limited thereto.

Figure 5:
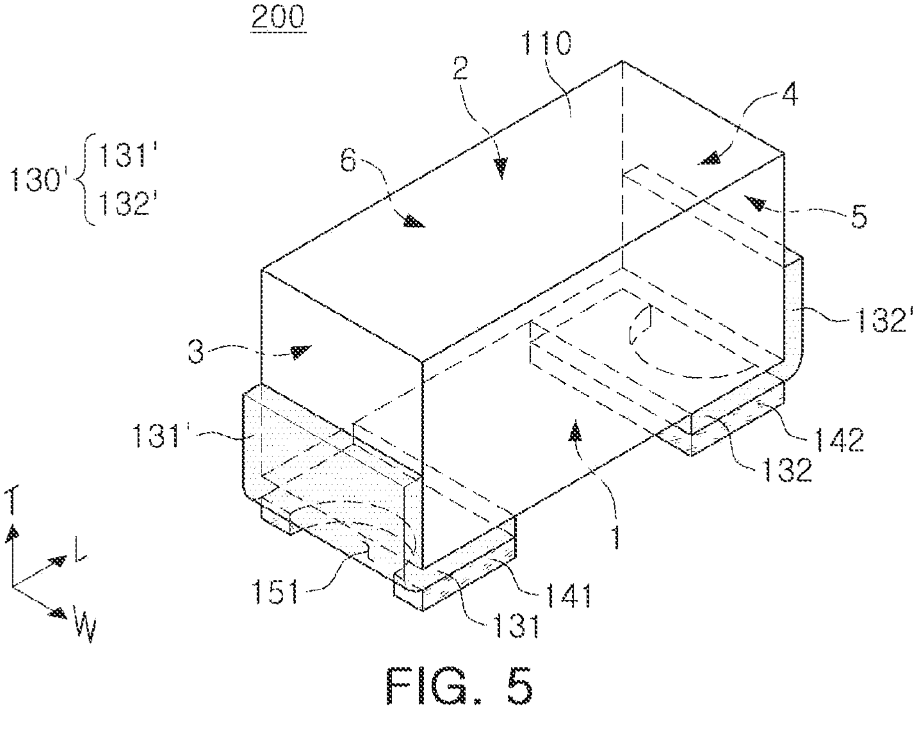
FIG. 5 is a perspective diagram illustrating a structure in which an external electrode of a coil component extends onto a side surface of a body.

FIG. 5 is a perspective diagram illustrating a structure in which an external electrode of a coil component extends onto a side surface of a body.

As illustrated in FIG. 5, an external electrode 130' of the coil component 200 of FIG. 2 may extend to cover at least a portion of the third surface 3 and the fourth surface 4 of the body 110.

In this case, although not illustrated, a structure in which the internal coil 120 of the body 110 may be exposed to the first surface 1, and also a structure in which the internal coil 120 of the body 110 may be exposed to the third surface 3 and the fourth surface 4 and may be connected to the first and second external electrodes 131' and 132' may be included.

Although not illustrated, the coil component 100 in the first example embodiment illustrated in FIG. 1 may also have a structure in which the external electrode 130 may extend to cover at least a portion of the third surface 3 and the fourth surface 4 as illustrated in FIG. 5.

Figure 6:
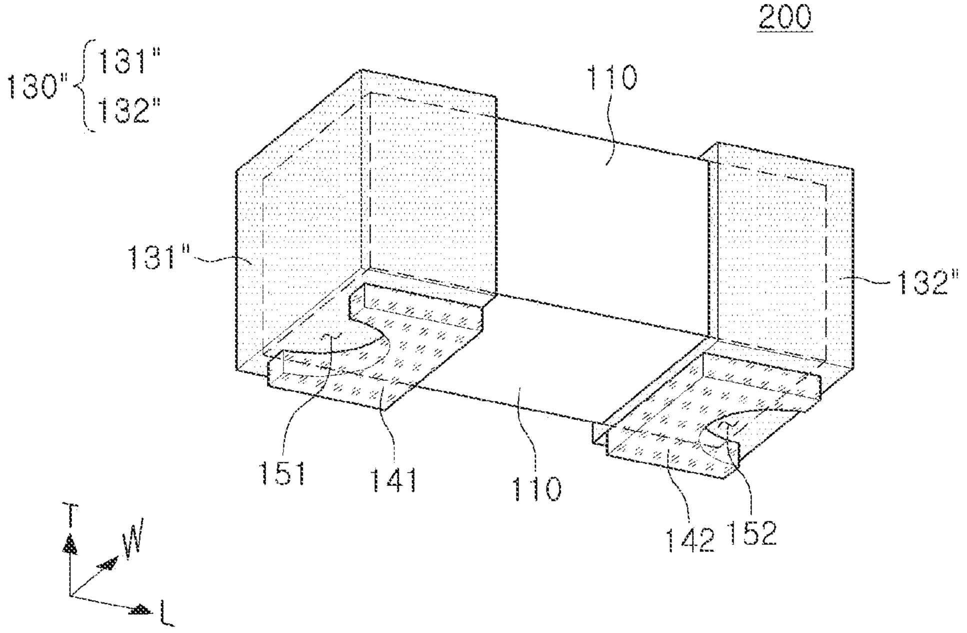
FIG. 6 is a perspective diagram illustrating a structure in which an external electrode of a coil component extends onto an upper surface of a body.

FIG. 6 is a perspective diagram illustrating a structure in which an external electrode of a coil component extends onto an upper surface of a body.

For ease of description, the coil component 200 of the second example embodiment is illustrated in FIG. 6, but the structure in which the external electrode 130" illustrated in FIG. 6 extends may also be applied to the coil component 100 of the first example embodiment. The external electrode 130" may extend to cover at least a portion of the second surface 2 of the body 110, and the second surface 2 may oppose the upper surface or the mounting surface of the body 110. In this case, although not illustrated, a structure in which the internal coil 120 of the body 110 may be exposed to the first surface 110 and also a structure in which the internal coil 120 may be exposed to the third surface 3 and the fourth surface 4 and may be connected to the first and second external electrodes 131" and 132" may be included.

Figure 7:
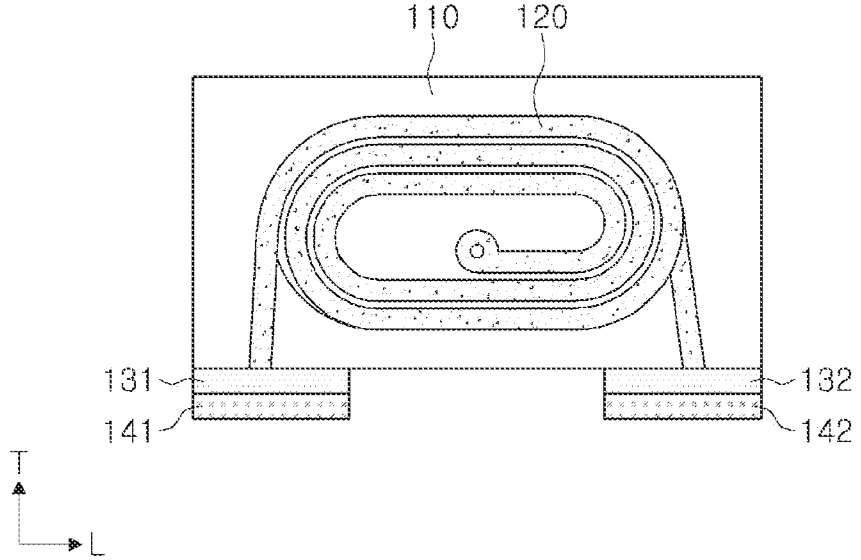
FIG. 7 is a lateral diagram schematically illustrating a structure including an example of an internal configuration of a coil component.

FIG. 7 is a lateral diagram schematically illustrating a structure including an example of an internal configuration of a coil component.

FIG. 7 illustrates an example in which the coil components 100 and 200 of may be configured as wound type inductors. As illustrated in FIG. 7, the coil 120 in the body 110 may be vertically disposed to be parallel to a width direction W of the body 110, and the configuration may be applied to both coil components 100 and 200 of the first and second embodiment.

According to the example illustrated in FIG. 7, the coil 120 may be arranged in a winding type, and an end of the coil 120 may be exposed to the first surface 1 of the body 110, and may be connected to the external electrode 130 disposed on the lower surface. Although not illustrated in FIG. 7, a coil component having the above-described structure may be applied to the example in which the coil 120 is a stacked type or thin film type inductor other than a wound type inductor.

Figure 8:
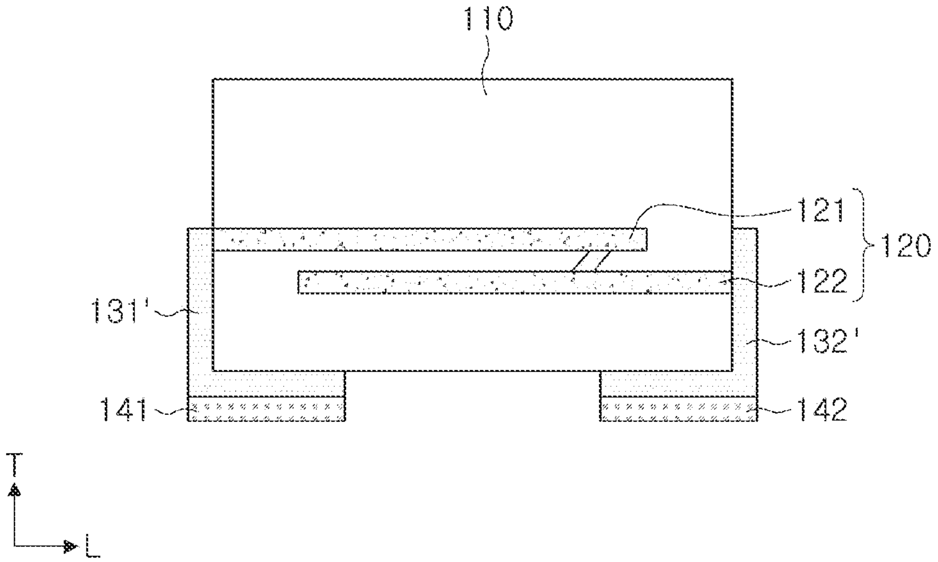
FIG. 8 is a lateral diagram schematically illustrating a structure including an example of an internal configuration of a coil component.

FIG. 8 is a lateral diagram schematically illustrating a structure including an example of an internal configuration of a coil component.

The coil component illustrated in FIG. 8 may have a structure of a horizontally arranged winding type coil 120, and in this case, the coil 120 may include the upper coil 121 and a lower coil 122, and may also include a connection portion connecting the upper coil and the lower coil. As illustrated in FIG. 8, ends of the upper and lower coils 121 and 122 may be exposed to the side surfaces of the body 110, respectively, and the exposed ends of the upper and lower coils 121 and 122 may be connected to the first and second external electrodes 131' and 132'. Although not illustrated in FIG. 8, a coil component having the above described structure may also be applied to a stacked type or thin film type inductor, other than a wound type inductor. Elements similar to those in the aforementioned example embodiment will not be repeated to avoid overlapping descriptions.

Figure 9:
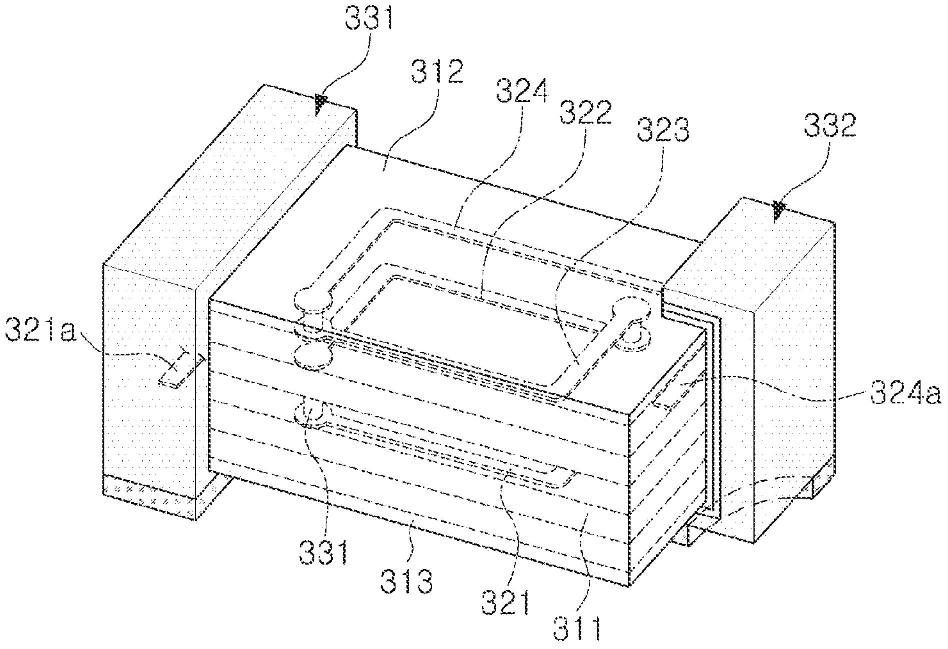
FIG. 9 is a schematic diagram illustrating a structure including an example of an internal configuration of a coil component, and a portion of elements are not illustrated to clearly show the configuration.

FIG. 9 is a schematic diagram illustrating a structure including an example of an internal configuration of a coil component, and a portion of elements are not illustrated to clearly show the configuration.

FIG. 9 illustrates an example in which a multilayered inductor is applied to the example embodiment, and also illustrates a structure in which external electrodes 331 and 332 extend to an upper portion of a multilayer inductor. In FIG. 9, a portion of regions of the external electrode 332 are not illustrated to show a specific internal structure. The multilayer inductor applied to the example embodiment may be manufactured by laminating a plurality of magnetic sheets 311 in the thickness direction (T) and pressing the magnetic sheets, for example, and multilayer coil patterns 321 to 324 may be disposed on one surface of each magnetic sheet 311. The coil patterns 321 to 324 upwardly and downwardly adjacent to each other may penetrate through the magnetic sheet 311, may be electrically connected to the via 341 of which upper and lower ends are exposed.

In this case, cover layers 312 and 313 may be disposed on upper and lower portions of the uppermost and lowermost insulating sheets 311, respectively. The cover layers 312 and 313 may be formed by laminating sheets having the same configuration as that of the magnetic sheet 311 other than the configuration in which the coil pattern is not arranged.

The coil patterns 321 to 324 may be formed of a conductive metal, and materials such as copper (Cu) or copper (Cu) alloy may be used, but an example embodiment thereof is not limited thereto. A portion of the coil patterns 321 and 324 may be electrically connected to the first and second external electrodes 331 and 332.

For example, the coil patterns 321 and 324 disposed on the uppermost layer and the lowermost layer may have first and second lead portions 321*a* and 324*a*, respectively, exposed through both surfaces of the inductor body 110 in the length direction to be connected to the first and second external electrodes 331 and 332. The elements similar to those in the aforementioned example embodiment will not be repeated to avoid overlapping descriptions.

Figure 10:
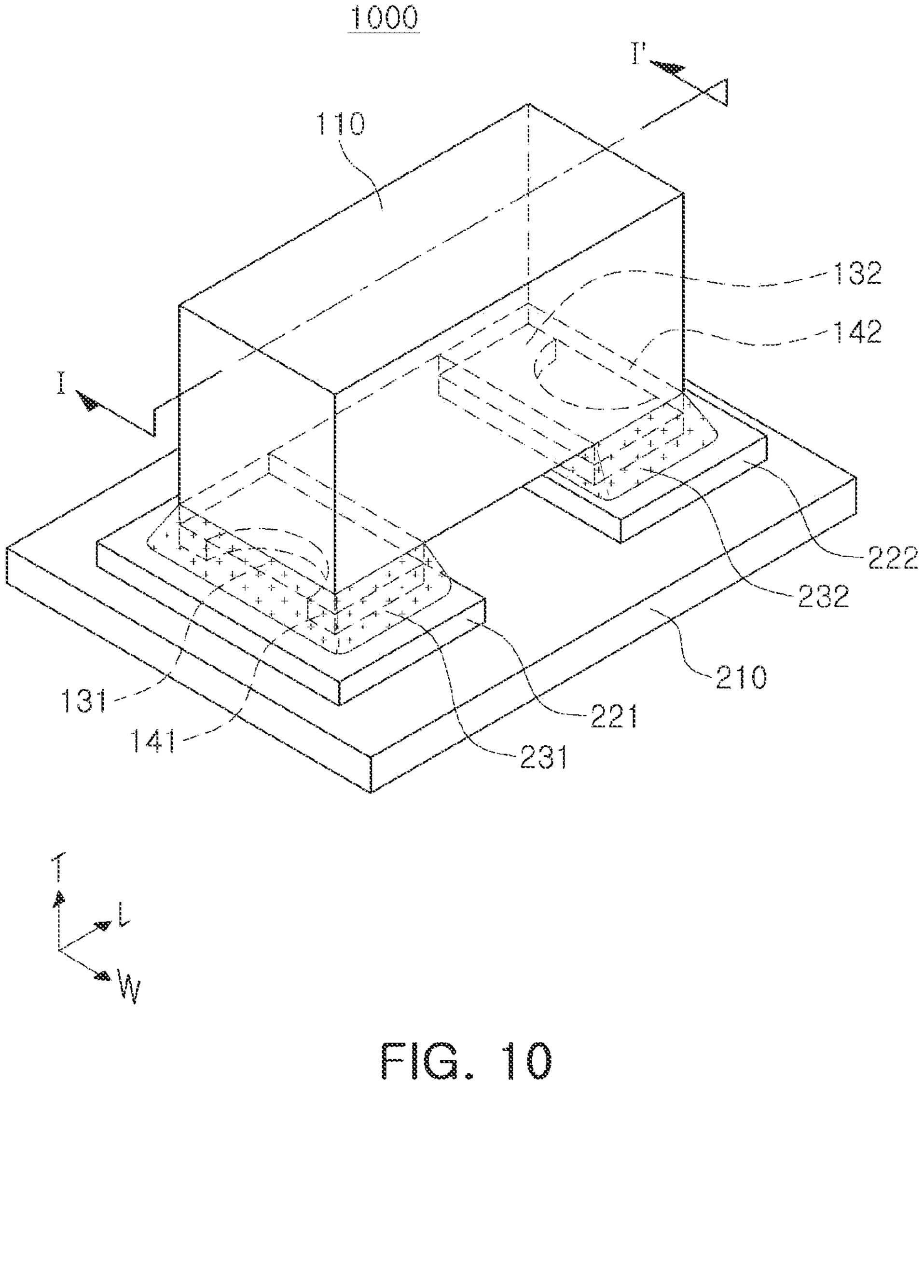
FIG. 10 is a perspective diagram illustrating a structure in which a coil component is mounted on a substrate.
Figure 11:
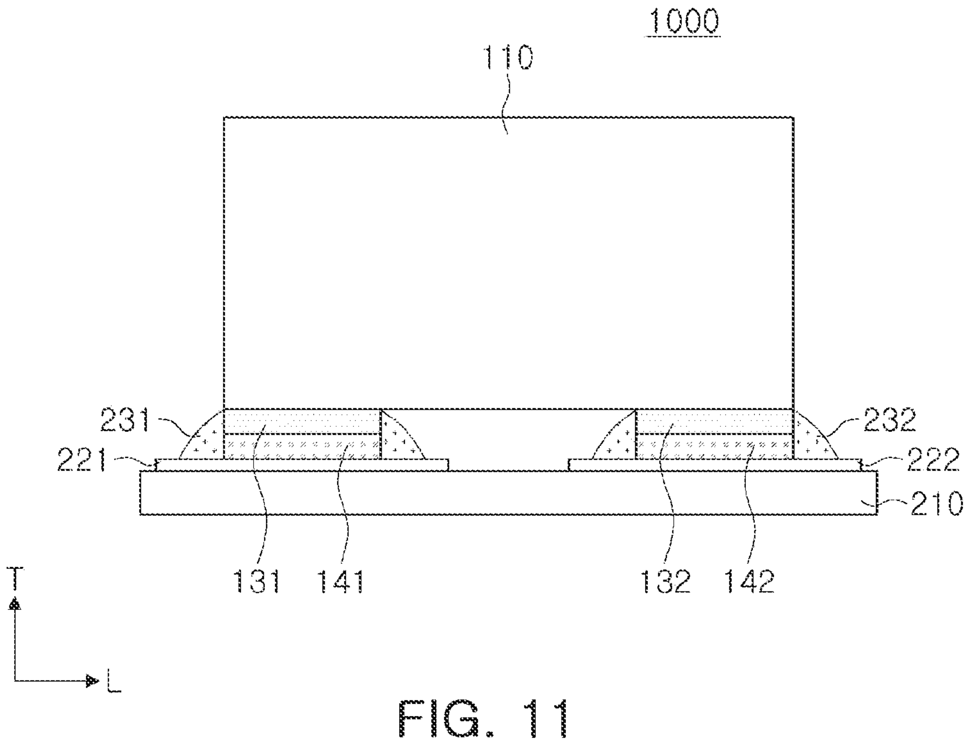
FIG. 11 is a lateral diagram illustrating a structure in which the coil component illustrated in FIG. 10 is mounted.

FIG. 10 is a perspective diagram illustrating a structure in which a coil component is mounted on a substrate. FIG. 11 is a lateral diagram illustrating a structure in which the coil component illustrated in FIG. 10 is mounted.

The coil components 100 and 200 in the first and second example embodiments described above may be mounted on the substrate 210 through solders 231 and 232 and electrode pads 221 and 222, and FIG. 10 illustrates a structure 1000 in which a coil component 200 is disposed on a substrate 210 according to the second example embodiment.

First and second terminals 141 and 142 may be disposed on the lower surfaces of the first and second external electrodes 131 and 132 of the coil component 200, and the coil component 200 may be disposed on the substrate 210 such that the first and second terminals 141 and 142 may be in contact with and connected to the first and second electrode pads 221 and 222. Solders 231 and 232 may be disposed on the side surfaces of the external electrode 130 and the terminal 140 to electrically connect the first and second electrode pads 221 and 222 and to fix the coil component 200. In the example embodiment, the coil components 100 and 200 are illustrated as being mounted on the substrate 210 by the solders 231 and 232, but a conductive paste may be used instead of solder if necessary.

As in the first and second embodiments, when the second layers **141*b* and 142*b* formed of a conductor layer are formed on the entire circumferential surfaces of the first and second terminals 141 and 142, the entire circumferential surface of the first and second terminals 141 and 142 may be soldered, and distortion of positions between a chip and a substrate in mounting may be addressed. Also, a bonding area with the solders 231 and 232** may increase during soldering, such that adhesive strength may improve.

Also, in the case of the coil component 200 according to the second embodiment, first and second recessed portions 151 and 152 may be formed in the first and second terminals 141 and 142, and the first and second recessed portions 151 and 152 may be filled with the solder 231 and 232. Since the first and second recessed portions 151 and 152 are filled with the solders 231 and 232, even when the same amount of solder is used, the height of the solder fillet may be lower than that of a structure which does not include recessed portions. When the height of the solders 231 and 232 is high, a piezoelectric vibration transmission path in which vibrations of the internal elements of the body 110 are transmitted to the substrate 210 may be formed, but the coil component 200 in the second example embodiment, by forming the height of the solders 231 and 232 to be low, a maximum displacement point with solder fillet in the body 110 may be spaced apart, thereby blocking the vibration transmission path and effectively reducing acoustic noise.

Therefore, in the case of the coil component 100 in the first example embodiment, since the coil component 100 has a structure in which the recessed portion 150 is not formed in the terminal 140, in the coil component 200 of the second example embodiment, the height of the solder fillet may be lowered when soldering using the same amount of solder as compared to the coil component 100 of the first example embodiment.

FIG. 11 is a lateral diagram illustrating an example corresponding to both of the structures of the coil components 100 and 200 described in the first and second example embodiments, and when soldering using the same amount of solder, there may be a difference in heights of solders between the first and second example embodiments in the diagrams.

Also, according to the coil component as described above, by including the structure which may reduce acoustic noise, the amount of piezoelectric vibrations of the coil component transmitted to the substrate in an audible frequency within 20 kHz may also be effectively reduced.

Accordingly, by reducing the high-frequency vibrations of the coil component, malfunctioning of sensors, an issue caused by high-frequency vibrations of 20 kHz or higher of the electronic component in the fields of IT or industrial/electric fields, and accumulation of internal fatigue caused by long-term vibrations of the sensor may be addressed. The high-frequency noise may refer to a signal having a frequency exceeding an upper limit of the frequency range determined as an operating frequency when designing the coil components 100 and 200 of the example embodiments.

Figure 12:
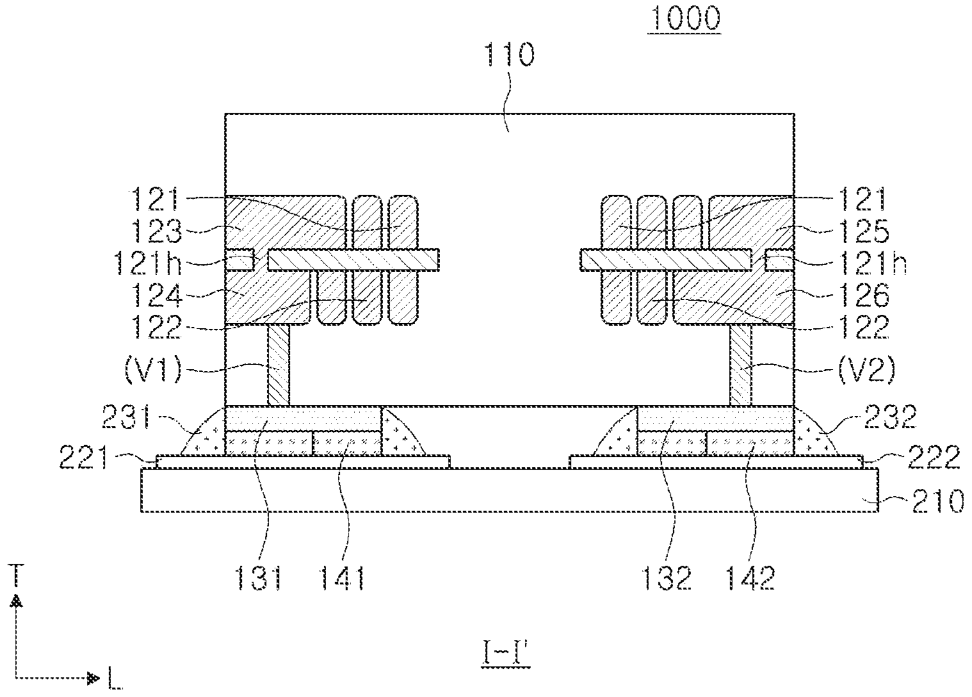
FIG. 12 is a cross-sectional diagram illustrating a structure in which the coil component illustrated in FIG. 10 is mounted taken along line I-I'.

FIG. 12 is a cross-sectional diagram illustrating a structure in which the coil component illustrated in FIG. 10 is mounted taken along line I-I'.

FIG. 12 discloses a schematic example of a structure of a coil component including a thin-film inductor having a coil pattern disposed therein, and as described above, the structure may be applied to a winding type structure or a stacked structure as well.

In the structure illustrated in FIG. 12, the upper coil pattern 121 and the lower coil pattern 122 of the thin film inductor may be disposed, respectively, and may be connected to the external electrode 130 disposed on the first surface 1 of the body 110 through vias V1 and V2.

FIG. 12 illustrates a structure in which solders 231 and 232 may fill the first and second recessed portions 151 and 152 and may be disposed on side surfaces of the first and second external electrodes 131 and 132 and the first and second terminals 151 and 152.

Figure 13A:
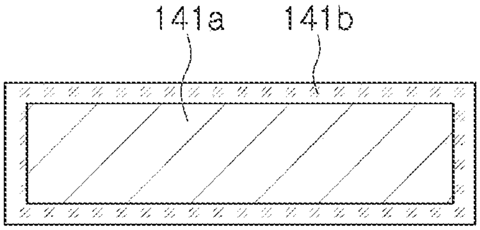
FIG. 13A is a cross-sectional diagram illustrating a terminal of an example embodiment.
Figure 13B:
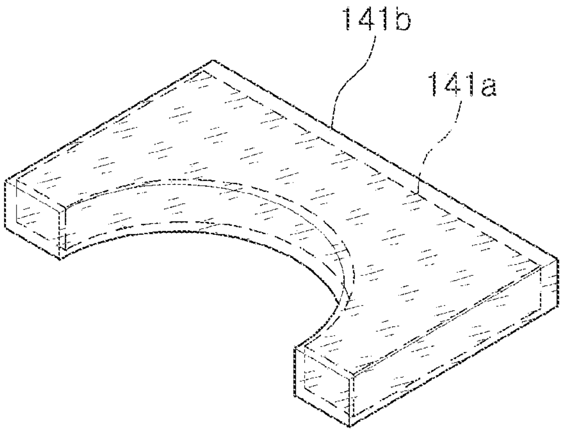
FIG. 13B is a diagram illustrating a first terminal in which a first cut-out portion is formed.

FIG. 13A is a cross-sectional diagram illustrating a terminal of an example embodiment. FIG. 13B is a diagram illustrating a first terminal in which a first cut-out portion is formed.

As described above, a terminal 140 in the example embodiment may include a first layer **140*a* and a second layer 140*b*** regardless of whether a recessed portion is formed.

The first layer **140*a* may include a flexible metal. As an example, but not limited thereto, the first layer 140*a* may include at least one of copper (Cu), gold (Au), and aluminum (Al). As the first and second terminals 141 and 142 include a flexible metal, a damping effect for reducing vibrations of the coil component 100** may be obtained, and acoustic noise may be reduced.

The second layer **140*b* may be formed in the form of a conductor layer on the surface of the first layer 140*a*. The second layer 140*b* is a conductor layer including a conductive metal and may be formed of a plating layer. The second layer 140*b*** may include, for example, at least one of nickel (Ni) and tin (Sn), but an example embodiment thereof is not limited thereto.

As illustrated in FIG. 13A, the second layer **141*b* may be disposed in the form of a plating layer surrounding the first layer 141*a*, and as the second layer 141*b* includes a material including at least one of nickel (Ni) and tin (Sn), a sufficient bonding strength with the solders 231 and 232** may be secured.

FIG. 13B discloses the shape of the first terminal 141 in which the first recessed portion 151 is formed, and as described above, the first terminal 141 may include a first layer **141*a* and a second layer 141*b* surrounding the first layer 141*a*, this configuration may also be applied to the second terminal 142**.

According to the aforementioned example embodiments, a coil component which may reduce acoustic noise may be provided.

Also, a coil component which may reduce high-frequency vibrations above 20 kHz may be provided.

Further, a coil component which may block and suppress the vibration transmission path of the inductor may be provided.

While the exemplary embodiments have been shown and described above, it will be apparent to those skilled in the art that modifications and variations could be made without departing from the scope of the present invention as defined by the appended claims.

What is claimed is:

1. A coil component, comprising:

a body including resin and magnetic metal particles;

a coil disposed in the body;

first and second external electrodes disposed on a first surface of the body, which is a lower surface of the body, spaced apart from each other, and connected to the coil; and first and second terminals disposed on lower surfaces of the first and second external electrodes, respectively, to be in contact with the first and second external electrodes, wherein first and second recessed portions are defined in at least a portion of the first terminal and at least a portion of the second terminal, respectively, the first and second terminals are configured such that a solder or a conductive paste is disposed on side surfaces of the first and second external electrodes and first and second side surfaces of the first and second terminals, for electrical connection of the first and second terminals to a substrate, and the first and second side surfaces of the first and second terminals, respectively including the first and second recessed portions, are coplanar with the side surfaces of the first and second external electrodes, respectively.

2. The coil component of claim 1, wherein the first and second terminals respectively include upper surfaces in contact with the first and second external electrodes, lower surfaces opposing the upper surfaces in a thickness direction, the first and second side surfaces connecting the upper surfaces to the lower surfaces and opposing each other in a length direction, and third and fourth side surfaces connecting the first side surfaces to the second side surfaces and opposing each other in a width direction, wherein the first recessed portion is defined on the first side surface of the first terminal, and wherein the second recessed portion is defined on the second side surface of the second terminal.

3. The coil component of claim 2, wherein the first side surface of the first terminal is arranged in an outer side than the second side surface of the first terminal in the length direction, and wherein the second side surface of the second terminal is arranged in an outer side than the first side surface of the second terminal in the length direction.

4. The coil component of claim 2, wherein a length of each of the first and second recessed portions in the length direction is smaller than a length of each of the first and second terminals in the length direction.

5. The coil component of claim 4, wherein a width of each of the first and second recessed portions in the width direction varies in the length direction.

6. The coil component of claim 5, wherein a width of each of the first and second recessed portions in the width direction decreases in a direction towards a center of the first surface of the body.

7. The coil component of claim 1, wherein the body includes a second surface opposing the first surface, and third to sixth surfaces connecting the first and second surfaces to each other, wherein the coil is exposed to the third surface and the fourth surface opposing the third surface, and wherein the first and second external electrodes extend to cover at least portions of the third and fourth surfaces, respectively.

8. The coil component of claim 2, wherein a width of the first terminal in the width direction is equal to a width of the first external electrode in the width direction, and a width of the second terminal in the width direction is equal to a width of the second external electrode in the width direction.

9. A coil component, comprising:

a body including resin and magnetic metal particles;

a coil disposed in the body;

first and second external electrodes disposed on a first surface of the body spaced apart from each other, and connected to the coil; and first and second terminals disposed on the first and second external electrodes, respectively, wherein the first and second terminals include first and second recessed portions defined on first and second side surfaces of the first and second terminals, respectively, and the first and second terminals are configured such that a solder or a conductive paste is disposed on side surfaces of the first and second external electrodes and the first and second side surfaces of the first and second terminals, for electrical connection of the first and second terminals to a substrate, and the first and second side surfaces of the first and second terminals, respectively including the first and second recessed portions, are coplanar with the side surfaces of the first and second external electrodes, respectively.

10. The coil component of claim 9, wherein the first and second terminals respectively include upper surfaces in contact with the first and second external electrodes, lower surfaces opposing the upper surfaces in a thickness direction, the first and second side surfaces connecting the upper surfaces to the lower surfaces and opposing each other in a length direction, and third and fourth side surfaces connecting the first side surfaces to the second side surfaces and opposing each other in a width direction.

11. The coil component of claim 10, wherein the first side surface of the first terminal is arranged in an outer side than the second side surface of the first terminal in the length direction, and wherein the second side surface of the second terminal is arranged in an outer side than the first side surface of the second terminal in the length direction.

12. The coil component of claim 10, wherein a length of each of the first and second recessed portions in the length direction is smaller than a length of each of the first and second terminals in the length direction.

13. The coil component of claim 12, wherein a width of each of the first and second recessed portions in the width direction varies in the length direction.

14. The coil component of claim 13, wherein a width of each of the first and second recessed portions in the width direction decreases in a direction towards a center of the first surface of the body.

15. The coil component of claim 14, wherein a width of each of the first and second recessed portions in the width direction decreases in a direction towards a center of the first surface of the body.

16. The component of claim 10, wherein the body includes a second surface opposing the first surface, and third to sixth surfaces connecting the first and second surfaces to each other, wherein the coil is exposed to the third surface and the fourth surface opposing the third surface, and wherein the first and second external electrodes extend to cover at least portions of the third and fourth surfaces, respectively.

17. The coil component of claim 10, wherein a width of the first terminal in the width direction is equal to a width of the first external electrode in the width direction, and a width of the second terminal in the width direction is equal to a width of the second external electrode in the width direction.

18. The coil component of claim 1, wherein each of the first and second terminals comprises a first layer including a flexible metal and a second layer in a form of a plating layer surrounding the first layer.

19. The coil component of claim 18, wherein the flexible metal of the first layer includes at least one of copper (Cu), gold (Au), or aluminum (Al).

20. The coil component of claim 9, wherein each of the first and second terminals comprises a first layer including a flexible metal and a second layer in a form of a plating layer surrounding the first layer.

* * * * *